(12) United States Patent
Kaniyur et al.

(10) Patent No.: US 7,233,996 B2
(45) Date of Patent: Jun. 19, 2007

(54) MECHANISM TO SUPPORT MULTIPLE PORT CONFIGURATIONS

(75) Inventors: Narayanan G. Kaniyur, Newark, CA (US); Ronald L. Dammann, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 987 days.

(21) Appl. No.: 10/293,170

(22) Filed: Nov. 12, 2002

(65) Prior Publication Data

US 2004/0093423 A1 May 13, 2004

(51) Int. Cl.
*G06F 13/00* (2006.01)

(52) U.S. Cl. .............. 709/227; 709/232; 709/237; 709/250

(58) Field of Classification Search .......... 709/217, 709/219, 224, 225, 236, 250
See application file for complete search history.

(56) References Cited

U.S. PATENT DOCUMENTS

| | | | |
|---|---|---|---|
| 5,884,033 A * | 3/1999 | Duvall et al. ............ | 709/206 |
| 6,314,170 B1 * | 11/2001 | Noguchi et al. .......... | 379/93.32 |
| 6,591,304 B1 * | 7/2003 | Sitaraman et al. ........ | 709/238 |
| 6,941,366 B2 * | 9/2005 | Antes et al. ............ | 709/224 |
| 2002/0041572 A1 * | 4/2002 | Palm ..................... | 370/278 |
| 2002/0085567 A1 * | 7/2002 | Ku et al. ................ | 370/396 |

OTHER PUBLICATIONS

Alan Benner, "Fibre Channel Gigabit Communications and I/O for Computer Networks", McGraw Hill 1996, Chapters 6, 7, 8, 12 and 17.

* cited by examiner

*Primary Examiner*—Viet D. Vu
(74) *Attorney, Agent, or Firm*—Blakely, Sokoloff, Taylor & Zafman LLP

(57) ABSTRACT

In one embodiment, a method is provided. In the method of this embodiment, one operating mode of port circuitry may be selected from a plurality of operating modes of the port circuitry that may correspond to respective sets of one or more communication links via which the port circuitry may be capable of communicating when the port circuitry is operating in the respective operating modes. Each of the respective sets of one or more communication links may be different from each other. The method of this embodiment also may include selecting, based at least in part upon the one operating mode of the port circuitry, a set of filters. The port circuitry may be capable of determining, based at least in part upon the set of filters, whether to drop a packet that is received, or intended to be transmitted by the port circuitry.

28 Claims, 7 Drawing Sheets

MECHANISM TO SUPPORT MULTIPLE PORT CONFIGURATIONS

FIELD

This disclosure relates to the field of packet filtering.

BACKGROUND

In one conventional network, the network includes a plurality of subnets that may be identified by pre-assigned subnet identification values. In the network, a switch node couples together the subnets, and the subnets include one or more respective end nodes. Packets traversing the network include respective subnet identification values identifying the respective subnets from which the packets were transmitted.

Each node in the network may maintain one or more tables that may associate respective sets of subnet identification values with each port in the node. These sets of subnet identification values may identify, e.g., one or more subnets with which the node is permitted to communicate. When a port in the node receives a packet, the port may compare, in accordance with the communication protocol employed in the network, the subnet identification value contained in the received packet to one or more of these sets of subnet identification values. In accordance with the communication protocol employed in the network, the node may decide an appropriate manner in which to process the received packet, depending upon the result of such comparison.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
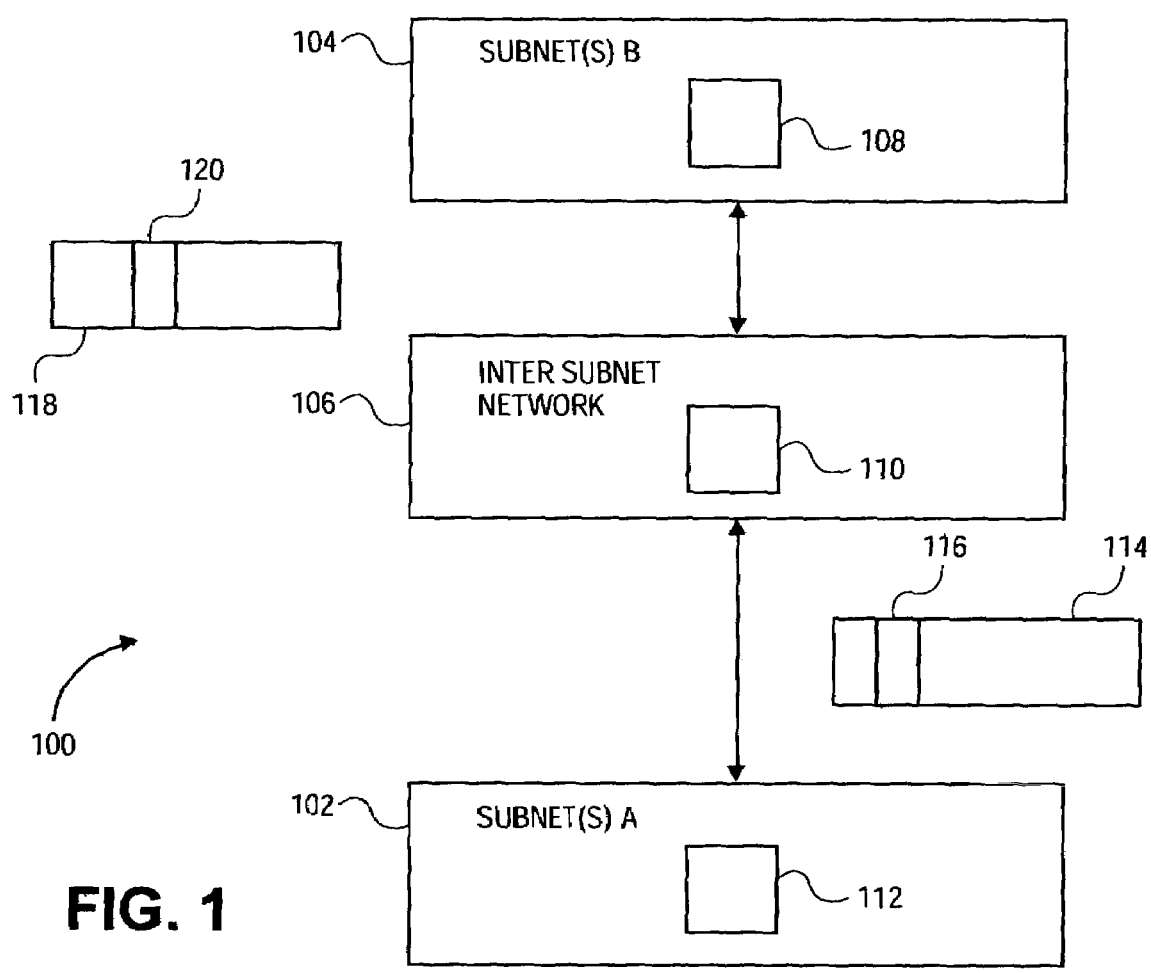
FIG. 1 is a diagram illustrating a network.

FIG. 1 illustrates one example of a network 100. Network 100 may include, for example, an intersubnet network 106. Network 106 may be coupled via respective sets of network communication links to one or more respective subnets 102 and 104. As used herein, a "communication link" means circuitry to transmit data between or among two or more devices; such circuitry may, for example, comprise one or more communications media through which one or more signals may be propagated between such devices. Also as used herein, a "subnet" means a group of one or more devices in a network or internetwork that may exchange data and/or commands among each other. As used herein, an intersubnet network means one or more devices that couple together a plurality of subnets.

Network 106 may include one or more intermediate stations (collectively and/or singly referred to by numeral 110 in FIG. 1). One or more intermediate stations 110 may comprise, for example, one or more switch and/or router nodes.

One or more subnets 102 may comprise, for example, one or more end station nodes 112. End station nodes 112 may be coupled via a respective set of network communication links to, and may exchange one or more packets (collectively and/or singly referred to by numeral 114 in FIG. 1) with one or more intermediate stations 110 in network 106. As used herein, a "packet" means a sequence of one or more values that may be transmitted from at least one sender to at least one receiver. Depending upon, for example, the communication protocol or protocols used in network 100, each packet 114 may be in compliance and/or compatible with an Infiniband™ protocol that is in compliance and/or compatible with Infiniband™ Architecture Specification, Volumes 1 and 2, Release 1.0a, published by the Infiniband$^{SM}$ Trade Association on Jun. 19, 2001 (hereinafter referred to as "the IBA Specification"). Of course, one or more packets 114 may be compatible and/or in compliance with other protocols without departing from this embodiment. Each respective end station 112 may include in each packet 114 transmitted from the respective end station 112 one or more respective values (collectively and/or singly referred to by numeral 116 in FIG. 1) that may identify the respective subnet to which the respective port (not shown) of that respective end station 112 may belong (e.g., to which that port may be coupled). If each packet 114 is in compliance and/or compatible with an Infiniband™ protocol, one or more values 116 in each respective packet 114 may comprise a respective p_key value.

One or more subnets 104 may comprise, for example, one or more end station nodes 108. End station nodes 108 may be coupled via a respective set of network communication links to, and may exchange one or more packets (collectively and/or singly referred to by numeral 118 in FIG. 1) with one or more intermediate stations 110 in network 106. Depending upon, for example, the communication protocol or protocols used in network 100, each packet 118 may be in compliance and/or compatible with an Infiniband™ protocol that is in compliance and/or compatible with the IBA Specification. Of course, one or more packets 118 may be compatible and/or in compliance with other protocols without departing from this embodiment. Each respective end station node 108 may include in each packet 118 transmitted from the respective end station node 108 one or more respective values (collectively and/or singly referred to by numeral 120 in FIG. 1) that may identify the respective subnet in which and/or to which the respective port (not shown) of that respective end station node 108 may be a member and/or may belong (e.g., to which that port may be coupled and with which the port may be authorized (e.g., by a not shown network management agent) to communicate). If each packet 118 is in compliance and/or compatible with an Infiniband™ protocol, one or more values 120 in each respective packet 118 may comprise a respective p_key value, and the network management agent may comprise one or more subnet managers and/or subnet administrators.

Figure 2:
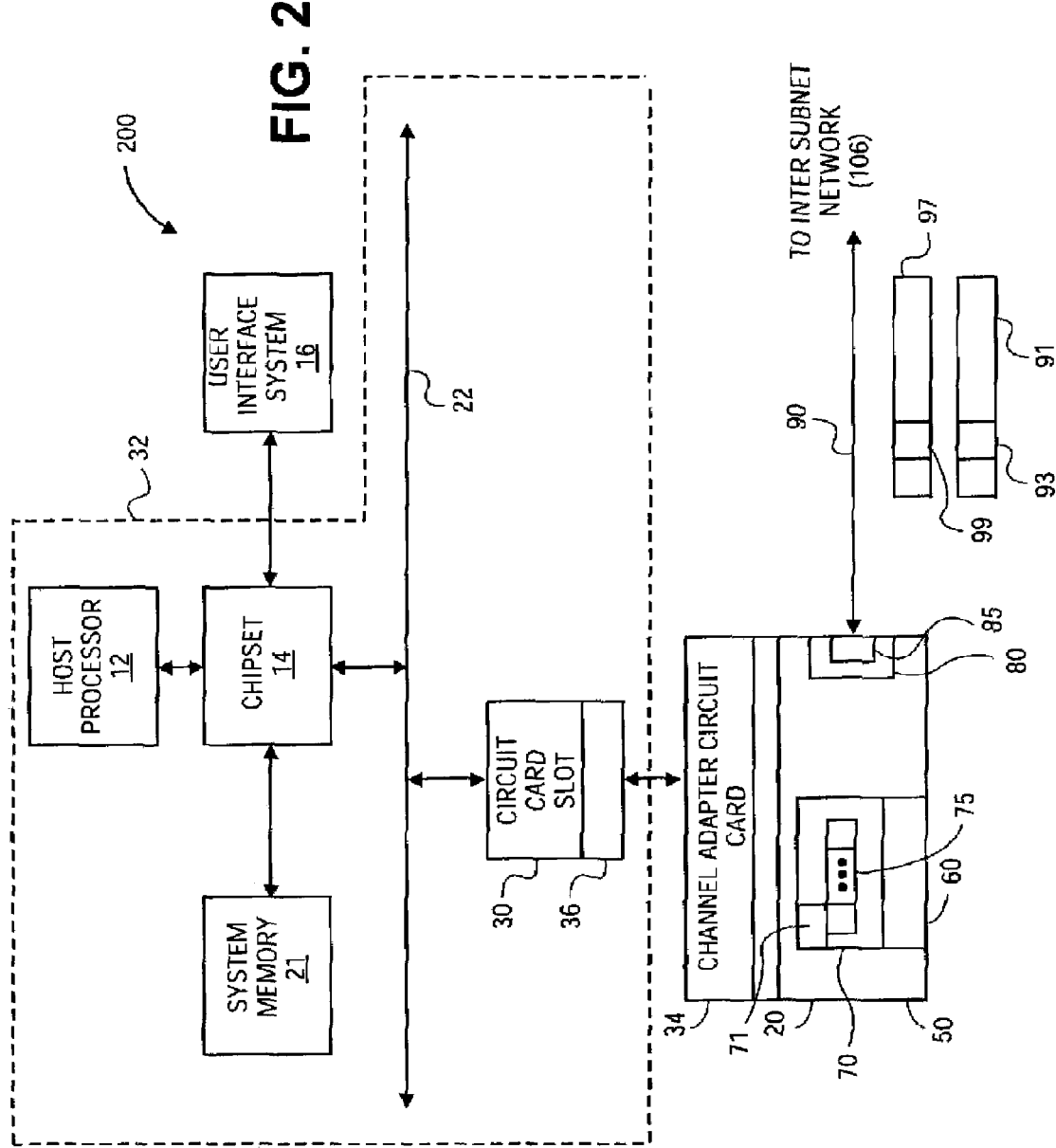
FIG. 2 is a diagram illustrating a system embodiment.

FIG. 2 illustrates the construction of a system embodiment 200 of the claimed subject matter. System 200 may be comprised in, for example, an end station node comprised in one or more end station nodes 112 or 108, or an intermediate station comprised in one or more intermediate nodes 110. Except as stated to the contrary herein, in network 100, each of the nodes comprised in nodes 108, 110, and 112 may comprise one or more respective systems that may be substantially identical (e.g., in terms of construction and/or operation) to system 200.

As shown in FIG. 2, system 200 may include a host processor 12 coupled to a chipset 14. Host processor 12 may comprise, for example, an Intel® Pentium® III or IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, a system memory 21 and a user interface system 16 to each other and to a bus system 22. Chipset 14 may also include an I/O bridge/hub system (not shown) that may couple the host bridge/bus system to bus 22. Chipset 14 may comprise integrated circuit chips, such as those selected from integrated circuit chipsets commercially available from the Assignee of the subject application (e.g., graphics memory and I/O controller hub chipsets), although other integrated circuit chips may also, or alternatively be used, without departing from this embodiment. User interface system 16 may comprise, e.g., a keyboard, pointing device, and display system that may permit a human user to input commands to, and monitor the operation of, system 200.

Bus 22 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems, without departing from this embodiment.

Processor 12, system memory 21, chipset 14, PCI bus 22, and circuit card slot 30 may be comprised in a single circuit board, such as, for example, a system motherboard 32. Circuit card slot 30 may comprise a PCI expansion slot that comprises a PCI bus connector 36. Connector 36 may be electrically and mechanically mated with a PCI bus connector 34 that is comprised in circuit card 20. Slot 30 and card 20 are constructed to permit card 20 to be inserted into slot 30. When card 20 is properly inserted into slot 30, connectors 34 and 36 become electrically and mechanically coupled to each other. When connectors 34 and 36 are so coupled to each other, operative circuitry 50 in card 20 becomes electrically coupled to bus 22.

Card 20 may comprise a channel adapter (CA) circuit card. When circuitry 50 is electrically coupled to bus 22, host processor 12 may exchange data and/or commands with circuitry 50, via chipset 14 and bus 22 that may permit host processor 12 to control and/or monitor the operation of circuitry 50. Circuitry 50 may include control circuitry 60 and computer-readable memory 70. Memory 70 may comprise read only and/or random access memory that may store one or more sets of filters 75 and program instructions 71. These program instructions 71, when executed, for example, by control circuitry 60 may result in, among other things, circuitry 50 executing operations that may result in execution in system 200 carrying out the operations described herein as being carried out by system 200.

Without departing from this embodiment, instead of being comprised in card 20, some or all of operative circuitry 50 may be comprised in other structures, systems, and/or devices that may be, for example, comprised in motherboard 32, coupled to bus 22, and exchange data and/or commands with other components in system 200. Additionally, without departing from this embodiment, system 200 may include a plurality of CA cards identical in construction and/or operation to card 20 coupled to bus 22 via a plurality of circuit card slots identical in construction and/or operation to slot 30.

Operative circuitry 50 also may include port circuitry 80. Port circuitry 80 may be controlled by control circuitry 60, and may include one or more ports 85. One or more ports 85 may be coupled to one or more communication links 90 that may be comprised in one of the subnets 102 or 104 in network 100, or in network 106 in network 100, and may be coupled to one or more other nodes in network 100, such as, for example, one or more intermediate nodes in network 106 in network 100.

In this embodiment, control circuitry 60 may exchange data and/or commands with port circuitry 80 that may result in control circuitry 60 selecting the number and/or type of operative, bi-directional I/O ports that may be comprised in one or more ports 85. More specifically, by exchanging appropriate data and/or commands with port circuitry 80, control circuitry 60 may control port circuitry 80 such that port circuitry 80 may operate in one of a plurality of possible operating modes selected by control circuitry 60. Depending upon the particular one of these operating mode in which circuitry 80 operates, the number and/or type of operative, bi-directional I/O ports that may be comprised in one or more ports 85 may differ.

Figure 4:
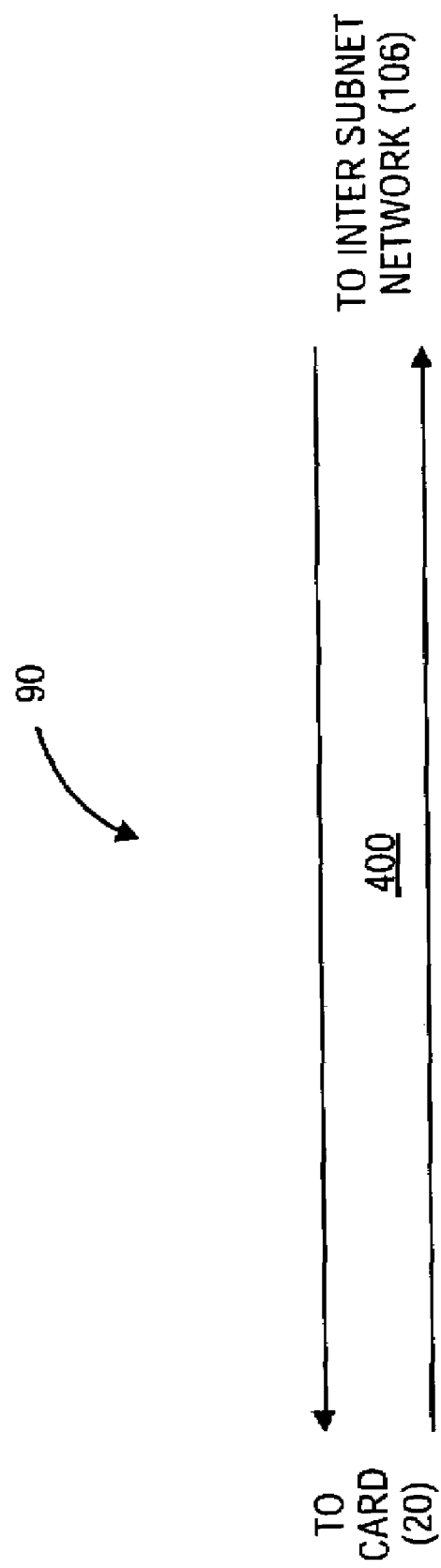
FIGS. 4 and 5 illustrate ways in which the system embodiment of FIG. 2 may be coupled to the intersubnet network shown in FIG. 1.

For example, in a first of these possible modes of operation, the one or more ports 85 may comprise a single operative bi-directional I/O port that may receive and/or transmit data and/or commands via a single bi-directional communication link 400 shown in FIG. 4 that may be comprised in one or more links 90. In this embodiment, link 400 and the single operative port that may be comprised in one or more ports 85 may be capable of permitting communication to and from this single operative port at respective maximum communication rates of, for example, 10 Gigabits (Gb) per second, although other maximum communication rates are possible without departing from this embodiment.

Figure 5:
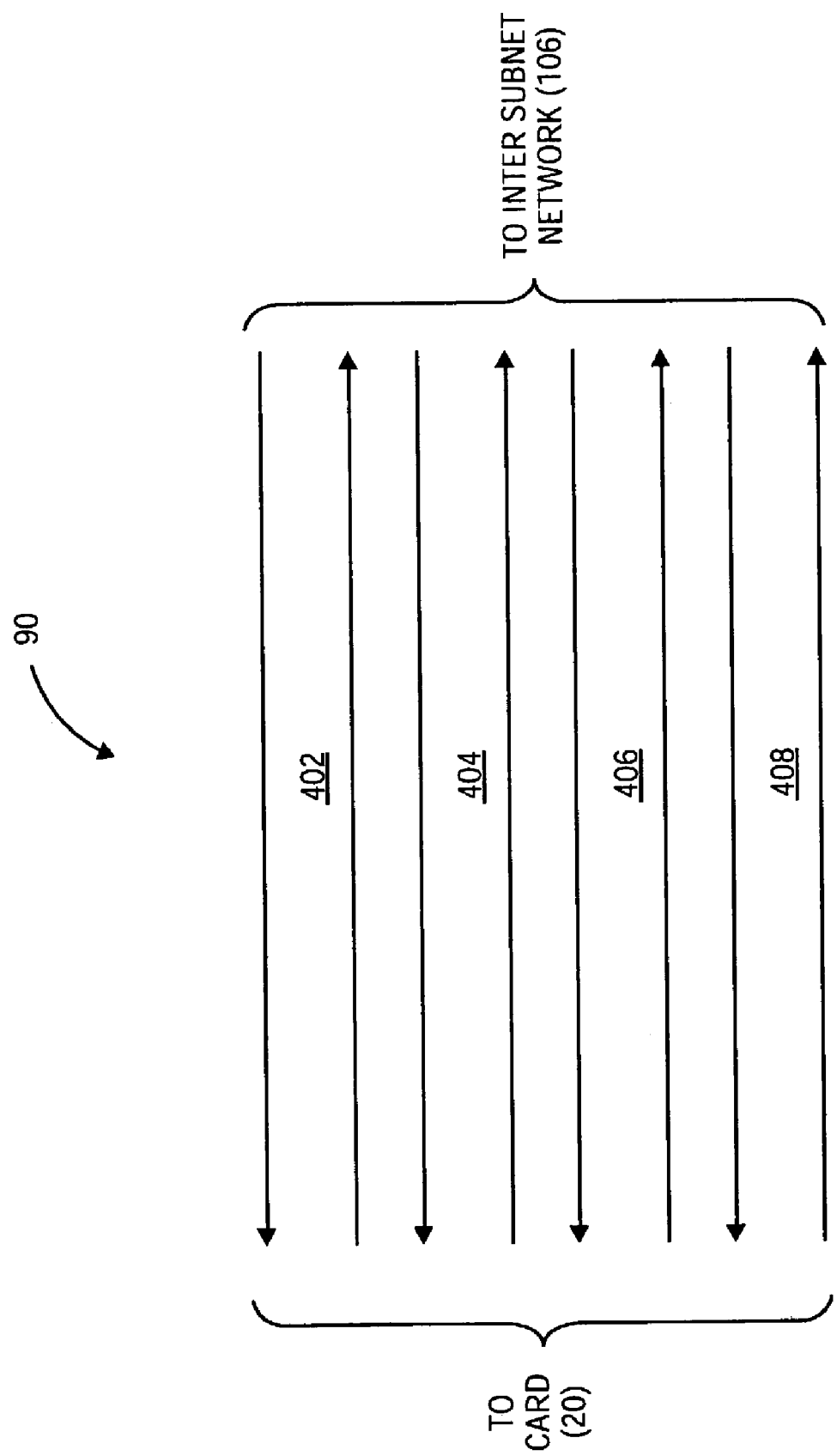

In a second of these possible modes of operation, the one or more ports 85 may comprise four operative bi-directional I/O ports that may receive and/or transmit data and/or commands via respective bi-directional communication links 402, 404, 406, and 408 shown in FIG. 5 that may be comprised in one or more links 90. In this embodiment, links 402, 404, 406, and 408 and the four operative ports that may be comprised in one or more ports 85 may be capable of permitting communication to and from these four operative ports at respective maximum communication rates of, for example, 2.5 Gb per second, although other maximum communication rates are possible without departing from this embodiment.

Although not shown in the Figures, each of the links 400, 402, 404, 406, and 408 may comprise two respective differential pairs. Each of these respective differential pairs may be used to permit communication in one respective communication direction (i.e., either to or from, respectively, a respective operative port of one or more ports 85).

In this embodiment, control circuitry 60 and/or port circuitry 80 may comprise link layer interface logic (not shown), link physical interface logic (not shown), port configuration logic (not shown), and/or additional circuitry (not shown) that may have functions and/or perform operations substantially of the types described in, e.g., co-pending U.S. patent application Ser. No. 10/022,330, filed Dec. 20, 2001, entitled "Multiple Port Allocation And Configurations For Different Port Operation Modes On A Host," which co-pending application is assigned to the Assignee of the subject application. As is described in said co-pending application, such link layer interface logic may be coupled to such link physical interface logic, such port configuration logic may be coupled to such link layer interface logic and link physical interface logic, and such additional circuitry may include, for example, a plurality of serializer/de-serializer circuitry coupled to the link physical interface logic. Such serializer/de-serializer circuitry also may be coupled to, for example, one or more links 90 and may permit exchange of data and/or commands with the link physical interface logic via one or more links 90. In this embodiment, the particular operating mode of port circuitry 80 may be selected by control logic 60, which may comprise, for example, the port configuration logic. Depending upon the particular operating mode selected, may appropriately signal the link layer interface logic and link physical logic. As a result of this signaling of the link layer interface logic and link physical interface logic, shared variant cyclic redundancy check (VCRC) circuitry, virtual lane flow control logic, and virtual lane packet processing logic that may be comprised in the link layer interface logic, and/or communication link training circuitry that may be comprised in the link physical interface logic may operate in respective modes of operation that may correspond to the mode of operation selected by the port configuration logic. In this embodiment, this may result in port circuitry 80 operating in the particular mode of operation selected by control circuitry 60.

In this embodiment, the plurality of possible operating modes of circuitry 80 may also comprise a third mode of operation of circuitry 80. In this third mode of operation of circuitry 80, the one or more ports 85 may comprise two operative bidirectional I/O ports that may receive and/or transmit data and/or commands via respective bidirectional communication links (e.g., links 402 and 404 shown in FIG. 5) that may be comprised in one or more links 90. In this embodiment, links 402 and 404 and the two operative ports that may be comprised in one or more ports 85 may be capable of permitting communication to and from these two operative ports at respective maximum communication rates of, for example, 2.5 Gb per second.

In this embodiment, in order to capable of implementing this third mode of operation, circuitry 80 may be capable of, for example, rendering inoperative two ports, selected by control circuitry 60, in the four ports that may be comprised in one or more ports 85 in the second mode of operation of circuitry 80. Of course, the particular construction and operation of control circuitry 60 and port circuitry 80 may vary without departing from this embodiment. Thus, for example, the control circuitry 60 and/or port circuitry 80 may comprise circuitry other than and/or in addition to that described previously, and/or that described in, e.g., said co-pending application, without departing from this embodiment. Indeed, there are many different ways, within the purview of those skilled in the art, in which circuitry 60 and/or circuitry 80 may be implemented. Circuitry 60 and/or circuitry 80 may be implemented in accordance with any of the variations, alternatives, and/or modifications that may be within the purview of those skilled in the art.

The respective maximum communication rates and numbers of ports that may be comprised in one or more ports 85, and the numbers of communication links that may be comprised in links 90 described above are merely for illustrative purposes and may vary without departing from this embodiment. Additionally, the number of possible modes of operation of circuitry 85 may vary without departing from this embodiment. Furthermore, the one or more nodes to which links 90 may be coupled may vary without departing from this embodiment. For example, if system 200 is comprised in one of the intermediate station nodes 110, links 90 may be coupled to, for example, one or more nodes in one or more nodes 108, 110, and/or 112, without departing from this embodiment.

Figure 3:
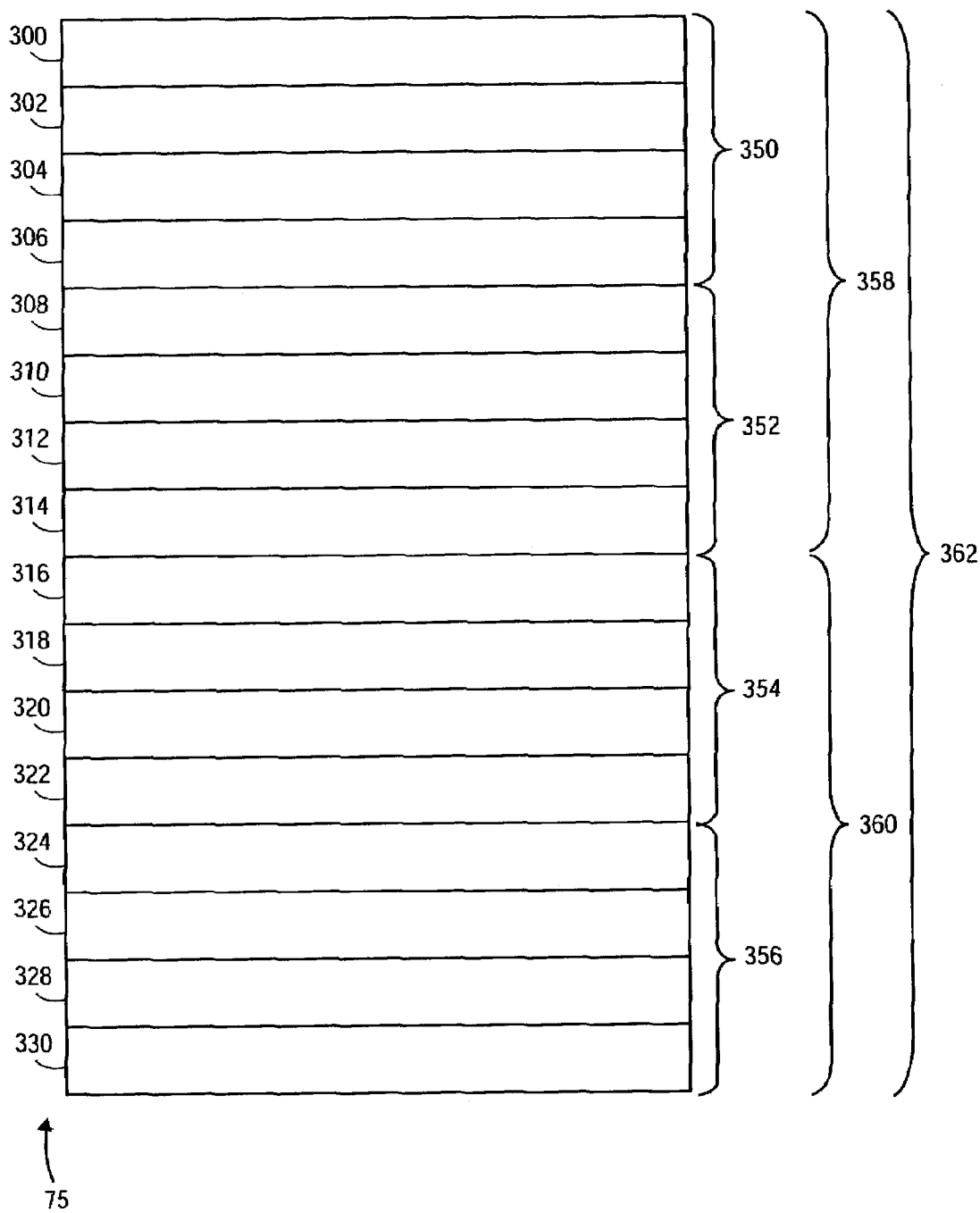
FIG. 3 illustrates sets of filters in accordance with an embodiment.

As shown in FIG. 3, in this embodiment, one or more sets of filters 75 may comprise seven sets of filters 350, 352, 354, 356, 358, 360, and 362. Set of filters 350 may comprise four filters 300, 302, 304, and 306. Set of filters 352 may comprise four filters 308, 310, 312, and 314. Set of filters 354 may comprise four filters 316, 318, 320, and 322. Set of filters 356 may comprise four filters 324, 326, 328, and 330. Set of filters 358 may comprise eight filters 300, 302, 304, 306, 308, 310, 312, and 314. Set of filters 360 may comprise eight filters 316, 318, 320, 322, 324, 326, 328, and 330. Set of filters 362 may comprise sixteen filters 300, 302, 304, 306, 308, 310, 312, 314, 316, 318, 320, 322, 324, 326, 328, and 330.

In this embodiment, filters 300, 302, 304, 306, 308, 310, 312, 314, 316, 318, 320, 322, 324, 326, 328, and 330 each may comprise one or more respective values. Each of these respective values may identify a respective valid subnet in which and/or to which one or more ports 85 may be a member and/or may belong (e.g., to which one or more ports 85 may be coupled and/or with which one or more ports 85 may be authorized (e.g., by the not shown network management agent) to communicate), respectively. If card 20 is capable of communicating using an Infiniband™ protocol, these one or more respective values each may comprise a respective p_key value.

In this embodiment, filter set 362 may be associated with the first mode of operation of circuitry 80. Control circuitry 60 may select a single filter set 362 to be used by circuitry 80 when circuitry 80 is in its first mode of operation. Also in this embodiment, four sets of filters 350, 352, 354, and 356 may be associated with the second mode of operation of circuitry 80. Control circuitry 60 may select these four sets of filters 350, 352, 354, and 356 to be used by circuitry 80 when circuitry 80 is in its second mode of operation. Additionally, in this embodiment, two sets of filters 358 and 360 may be associated with the third mode of operation of circuitry 80. Control circuitry 60 may select these two sets of filters 358 and 360 to be used by circuitry 80 when circuitry 80 is in its third mode of operation.

In this embodiment, filter set 362 may comprise a predetermined maximum number of filters. For example, in this embodiment, filter set 362 may comprise sixteen filters 300, 302, 304, 306, 308, 310, 312, 314, 316, 318, 320, 322, 324, 326, 328, and 330. Filter sets 358 and 360 may comprise respective subsets of filter set 362. Each of these subsets may comprise a respective half of the predetermined maximum number of filters in set 362. Thus, in this embodiment, filter sets 358 and 360 each may comprise eight respective filters.

Filter sets 350, 352, 354, and 356 also may comprise respective subsets of filter set 362. However, each of the respective subsets may comprise a respective fourth of the predetermined maximum number of filters in set 362. Thus, in this embodiment, filter sets 350, 352, 354, and 356 each may comprise four respective filters. Of course, the respective numbers of filters in filter sets 75, 350, 352, 354, 356, 358, 360, and 362, and which filter sets may be used by circuitry 80 when circuitry 80 is operating in its respective modes of operation, may vary without departing from this embodiment.

Figure 7:
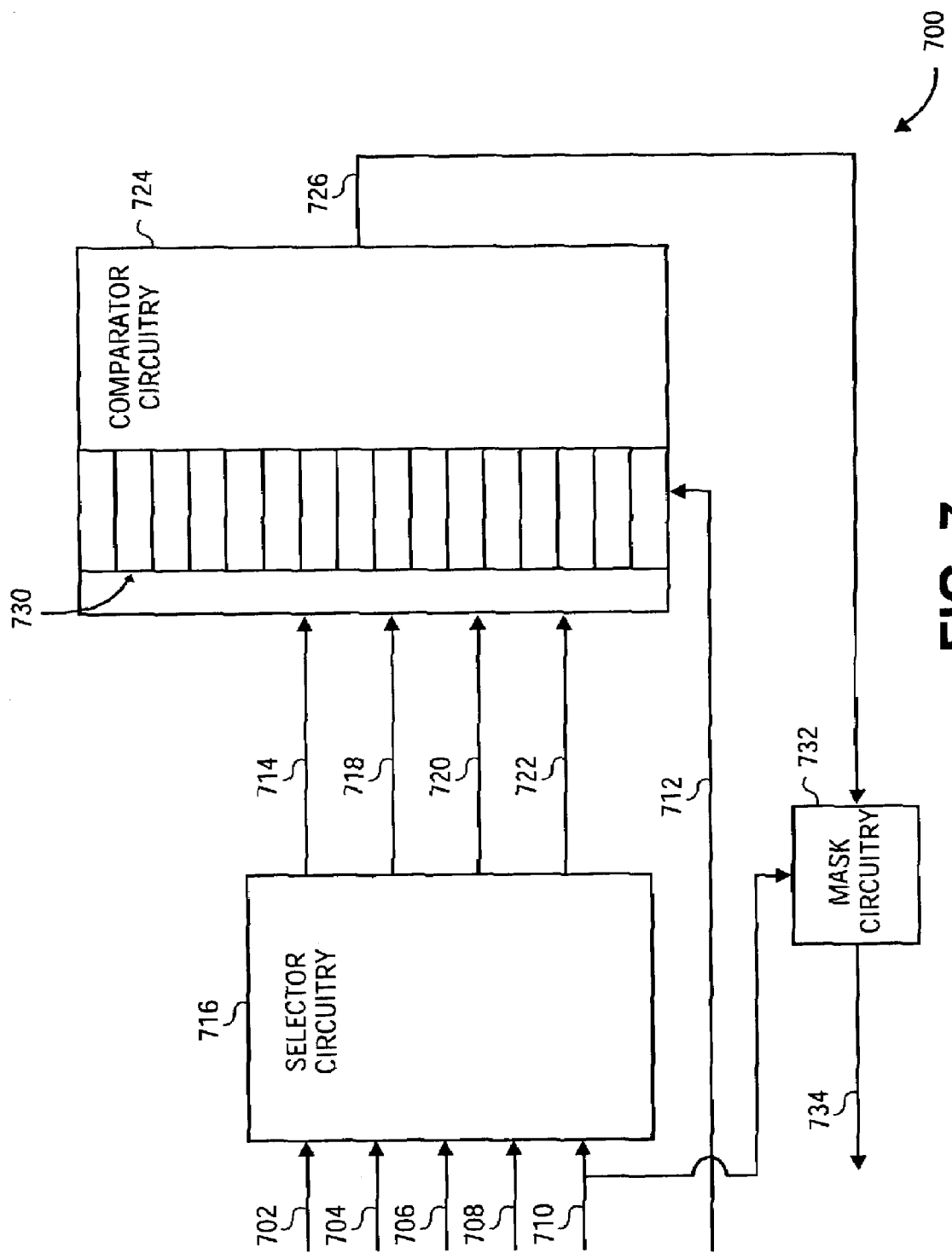
FIG. 7 is a diagram illustrating circuitry that may be comprised in a channel adapter in the system embodiment of FIG. 2.

FIG. 7 illustrates circuitry 700 that may be comprised in port circuitry 80 in this embodiment. As described below, circuitry 700 may comprise selector circuitry 716 that may receive, as inputs, values supplied to circuitry 716 via signal lines 702, 704, 706, 708, and 710. Based, at least in part upon these values, circuitry 716 may generate, as outputs, and supply, as inputs, to comparator circuitry 724 values that may be propagated to comparator circuitry 724 via signal lines 714, 718, 720, and 722. Comparator circuitry 724 may comprise, for example, sixteen mutually identical comparator circuits (collectively and/or singly referred to by numeral 730 in FIG. 7). Based, at least in part, upon the values supplied to circuitry 724 via lines 714, 718, 720, and 722, circuitry 724 may generate, as one or more outputs, and supply, as one or more inputs, to mask circuitry 732 one or more values that may be propagated to mask circuitry 732 via one or more signal lines 726. Based, at least in part upon the one or more values supplied to circuitry 732 via one or more lines 726, circuitry 732 may generate, as one or more outputs, one or more values that may be propagated via one or more signal lines 734.

Figure 6:
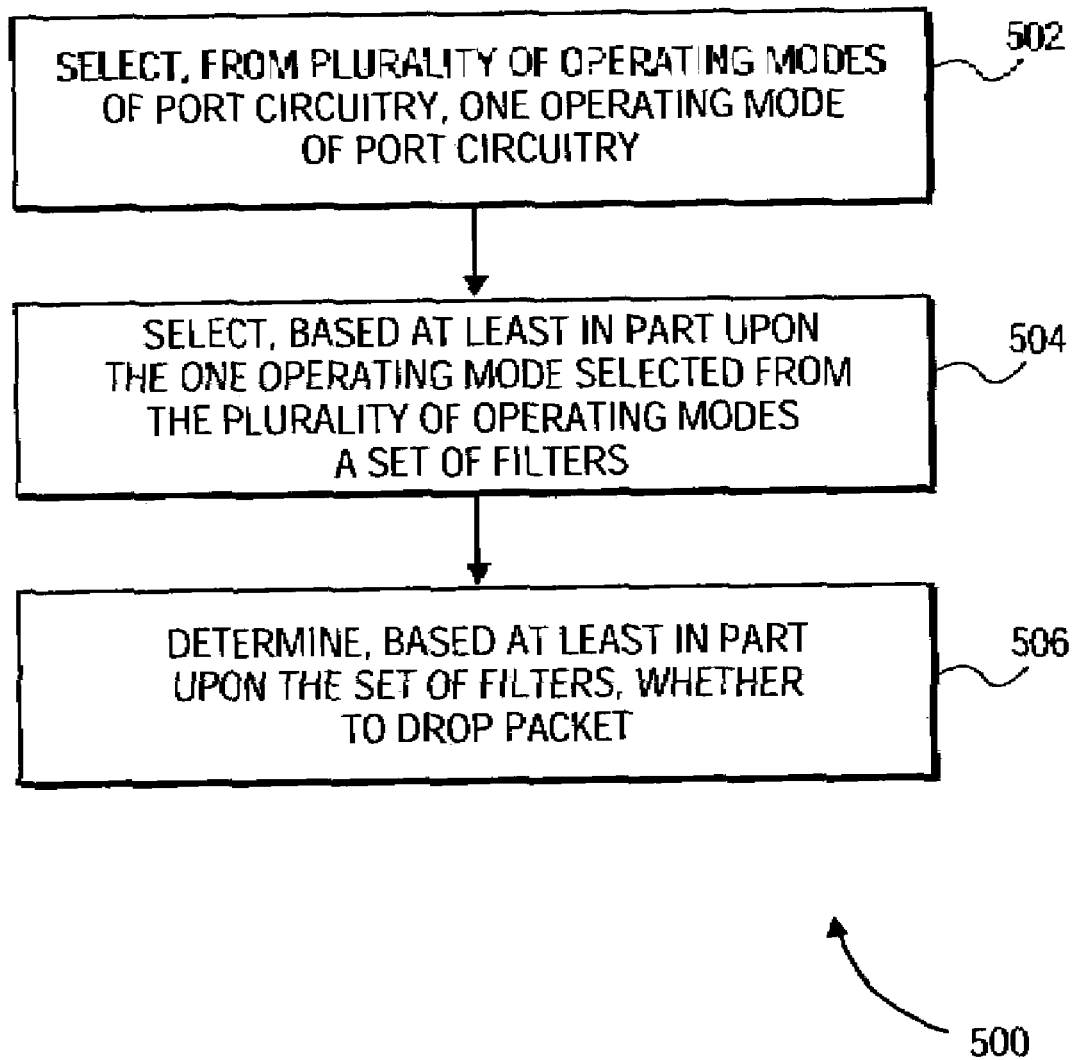
FIG. 6 is a flowchart illustrating operations that may be performed according to one embodiment.

With particular reference now being made to FIG. 6, operations 500 that may be carried out in system 200 in accordance with one embodiment will be described. Operations 500 may commence with, for example, control circuitry 60 selecting, from the plurality of possible operating modes of port circuitry 80, one desired operating mode of port circuitry 80, as illustrated by operation 502 in FIG. 6. The execution of operation 502 may be initiated by, for example, by host processor 12 in system 200 and/or the not shown network management agent in network 100. For example, host processor 12 may issue a command to control circuitry 60 via chipset 14 and bus 22 to begin execution of operation 502 in accordance with the issued command. Alternatively or additionally, the not shown network management agent may initiate the execution by control circuitry 60 of operation 502 by, for example, issuing a command to begin such execution to control circuitry 60 in one or more packets (not shown) transmitted to port circuitry 80 from one or more nodes (not shown) in network 100 that may comprise the agent. In response, at least in part, to the command issued by host processor 12 and/or the command issued by the agent, control circuitry 60 may commence execution of operation 502 in the manner specified in such commands. For example, the command issued by host processor 12 and/or the command issued by the network management agent may specify which of the possible operating modes of circuitry 80 that circuitry 60 is to select as a result of operation 502.

As a result of operation 502, control circuitry 60 may select, in accordance with the command issued by host processor 12 and/or the command issued from the network management agent, one mode of operation of port circuitry 80 from the plurality of possible operating modes of port circuitry 80. For example, for purposes of illustration, in this embodiment, as a result of operation 502, control circuitry 60 may select the first operating mode of circuitry 80 from the three possible operating modes of circuitry 80 (e.g., the first, second, and third operating modes of circuitry 80). Additionally or alternatively, this one operating mode of port circuitry 80 may be selected based at least in part upon the communication capabilities of port circuitry (not shown) in one or more other nodes in network 100 with which port circuitry 80 may be desired to communicate. Operative circuitry 50 and/or the network management agent may be capable of detecting these capabilities, and may initiate and/or command circuitry 60 to select, as a result of operation 502, an operating mode for circuitry 80 that may be appropriate given these detected capabilities.

Thereafter, as illustrated by operation 504 in FIG. 6, control circuitry 60 may select, based at least in part upon the one operating mode of circuitry 80 selected by circuitry 60 as a result of operation 502, one or more sets of filters to be used by circuitry 80 when circuitry 80 is operating in the one operating mode selected by circuitry 60. For example, if, as is the case in the present illustrative example, circuitry 60 selects, as a result of operation 502, the first mode of operation of circuitry 80, circuitry 60 may select, as a result of operation 504, filter set 362 associated with the first mode of operation of circuitry 80. Conversely, if circuitry 60 selects, as a result of operation 502, the second mode of operation of circuitry 80, circuitry 60 may select, as a result of operation 504, filter sets 350, 352, 354, and 356 associated with the second mode of operation of circuitry 80. Also conversely, if circuitry 60 selects, as a result of operation 502, the third mode of operation of circuitry 80, circuitry 60 may select, as a result of operation 504, filter sets 358 and 360 associated with the third mode of operation of circuitry 80.

As part of operation 502 and/or operation 504, control circuitry 60 may signal port circuitry 80. This may result in port circuitry 80 configuring one or more ports 85 such that one or more ports 85 may have the number and type of I/O ports associated with the one operating mode selected by circuitry 60 as a result of operation 502. As illustrated by operation 506, the signaling of port circuitry 80 by control circuitry 60 also may result in port circuitry 80 determining, based at least in part upon the one or more sets of filters selected by control circuitry 60 as a result of operation 504, whether to drop one or more packets (e.g., one or more packets 91) received via one or more links 90 by one or more ports 85 comprised in port circuitry 80. Alternatively or additionally, as also illustrated by operation 506, if port circuitry 80 is comprised in, for example, an intermediate station node in one or more nodes 110, the signaling of port circuitry 80 by control circuitry 60 also may result in port circuitry 80 determining, based at least in part upon the one or more sets of filters selected by control circuitry 60 as a result of operation 504, whether to drop one or more packets (e.g., one or more packets 97) intended to be transmitted from one or more ports 85 comprised in port circuitry 80 via one or more links 90. As used herein, "dropping" by a first device of a packet received by the first device means intentionally deleting and/or overwriting the packet while the packet is stored in memory (such as, for example, in this embodiment, not shown receive queue memory in port circuitry 80) of the first device, without transmitting the packet or a portion thereof from the first device to a second device that is external to the first device. As used herein, "dropping" by a first device of a packet that is intended to be transmitted from the first device means intentionally deleting and/or overwriting the packet while the packet is stored in memory (such as, for example, in this embodiment, not shown transmit queue memory in port circuitry 80) of the first device, without transmitting the packet or a portion thereof to a second device that is external to the first device.

Each of the one or more packets 91 may comprise a respective subnet identification value (collectively or singly referred to by numeral 93 in FIG. 2) that may identify a respective subnet in which and/or to which the port, from which the packet that comprises the respective subnet identification value originated, may be a member and/or may belong, respectively. As will be described below, as part of operation 506, port circuitry 80 may compare the respective subnet identification value 93 in each respective packet received by a receiving port in one or more ports 85 to the filters in the set of filters selected as a result of operation 504 and associated with that receiving port given the mode of operation of circuitry 80 selected in operation 502.

Likewise, each of the one or more packets 97 may comprise a respective subnet identification value (collectively or singly referred to by numeral 99 in FIG. 2) that may identify a respective subnet in which and/or to which the port in one or more ports 85 that is intended to transmit the packet that comprises the respective subnet identification value may be a member and/or may belong, respectively. As will be described below, as part of operation 506, if port circuitry 80 is comprised in, for example, an intermediate station node in one or more nodes 110, port circuitry 80 may compare the respective subnet identification value 99 in each respective packet to be transmitted by a transmitting port in one or more ports 85 to the filters in the set of filters selected as a result of operation 504 and associated with that transmitting port given the mode of operation of circuitry 80 selected in operation 502.

Port circuitry 80 may examine each received packet 91 to determine the respective subnet identification value 93 comprised therein. Respective subnet identification values 93 of respective packets 91 received by respective ports that may be comprised in one or more ports 85 may be forwarded by circuitry 80 to circuitry 700 via lines 702, 704, 706, and 708, respectively. That is, in this embodiment, as part of operation 506, port circuitry 80 may forward respective subnet identification values 93 of respective packets 91 received by respective ports that may be comprised in one or more ports 85 to selector circuitry 716 in circuitry 700.

More specifically, as stated previously, one or more ports 85 may comprise four ports. However, depending upon the operating mode of circuitry 80 selected in operation 502, the number and configuration of operative ports that may be comprised in one or more ports 85 may differ. For example, if the first operating mode is selected in operation 502, one or more ports 85 may comprise only a single operative port. Conversely, if the second operating mode is selected in operation 502, one or more ports 85 comprise four operative ports. Also conversely, if the third operating mode is selected in operation 502, one or more ports 85 may comprise two operative ports. Respective ports that may be comprised in one or more ports 85 may be coupled to respective lines 702, 704, 706, and 708. If a given port in one or more ports 85 is not operative in a given mode of operation of circuitry 80, data supplied from that inoperative port to selector circuitry 716 may be invalid.

Selector circuitry 716 may receive the respective subnet identification values that may be supplied to circuitry 700 via lines 702, 704, 706, and 708. Selector circuitry 716 also receives one or more control signals from control circuitry 60 via signal line 710. These one or more control signals may indicate the mode of operation of circuitry 80 selected in operation 502. Based at least in part upon these one or more control signals, selector circuitry 716 may select for output via lines 714, 718, 720, and 722 only those respective subnet identification values supplied to selector circuitry 716 from operative ports in one or more ports 85.

For example, if, as is the case in the present example, the first mode of operation of circuitry 80 is selected in operation 502, only a single port in one or more ports 85 may be operative. Accordingly, only the subnet identification values supplied via a single input line (e.g., line 702) may be valid, and data supplied via lines 704, 706, and 708 may be invalid. If this first mode of operation of circuitry 80 is selected in operation 502, as part of operation 506, selector circuitry 716 may broadcast, as outputs, via output lines 714, 718, 720, and 722 respective copies of each of the subnet identification values supplied to selector circuitry 716 from this single operative port via input line 702, and may ignore the inputs supplied via lines 704, 706, and 708.

Conversely, if the second mode of operation of circuitry 80 is selected in operation 502, four ports in one or more ports 85 may be operative. Accordingly, subnet identification values supplied via lines 702, 704, 706, and 708 all may be valid. If this second mode of operation of circuitry 80 is selected in operation 502, as part of operation 506, selector circuitry 716 may output via output lines 714, 718, 720, and 722 respective subnet identification values supplied to selector circuitry 716 from these four operative ports via input lines 702, 704, 706, and 708, respectively.

Also conversely, if the third mode of operation of circuitry 80 is selected in operation 502, only two ports in one or more ports 85 may be operative. Accordingly, subnet identification values supplied via two input lines (e.g., lines 702 and 704) may be valid, and data supplied via lines 706 and 708 may be invalid. If this third mode of operation of circuitry 80 is selected in operation 502, as part of operation 506, selector circuitry 716 may ignore inputs supplied via lines 706 and 708, may output via output lines 714 and 718 copies of each of the respective subnet identification values supplied to selector circuitry 716 from input 702, and may output via output lines 720 and 722 copies of each of the respective subnet identification values supplied to selector circuitry 716 from input 704.

As part of operation 506, outputs propagated via lines 714, 718, 720, and 722 may be received as inputs by comparator circuitry 724. Also as part of operation 506, comparator circuitry 724 also may receive as inputs, via lines 712, each of the filters 300, 302, 304, 306, 308, 310, 312, 314, 316, 318, 320, 322, 324, 326, 328, and 330 that may be comprised in filter set 362. In this embodiment, the number of comparator circuits 730 may be equal to the predetermined maximum number of filters in filter set 362. Each of the comparator circuits 730 may receive as a respective first input a respective one of the filters 300, 302, 304, 306, 308, 310, 312, 314, 316, 318, 320, 322, 324, 326, 328, and 330 that may be comprised in filter set 362.

More specifically, each of the comparator circuits 730 may be grouped into a respective one of four subsets of comparator circuits 730, and each of the four subsets may include four respective comparator circuits 730. As part of operation 506, one of these four respective subsets of comparator circuits 730 may receive, as first respective inputs, the respective filters comprised in set 350, a second of these four respective subsets may receive, as first respective inputs, the respective filters comprised in set 352, a third of these four respective subsets may receive, as first respective inputs, the respective filters comprised in set 354, and a fourth of these four respective subsets may receive, as first respective inputs, the respective filters comprised in set 356. As part of operation 506, each of these four respective subsets of comparator circuits 730 may receive as a second respective input the respective subnet identification values propagated via lines 714, 718, 720, and 722, respectively. Also as part of operation 506, each respective comparator circuit 730 may implement conventional algorithms that may determine whether the respective subnet identification value supplied to the respective comparator circuit as a second input is valid, and if it is valid, whether it matches the respective filter supplied to the respective comparator as a respective first input; these conventional algorithms may be in accordance with, e.g., the algorithms described in the IBA Specification for inbound p_key enforcement. Thus, if the first mode of operation of circuitry 80 is selected in operation 502, the filters in filter set 362 may be selected by circuitry 60 for comparison to the subnet identification value supplied via lines 714, 718, 720, and 722. Conversely, if the second mode of operation of circuitry 80 is selected in operation 502, the respective filters in filter sets 350, 352, 354, and 356, respectively, may be selected by circuitry 60 for comparison to the subnet identification values supplied via lines 714, 718, 720, and 722, respectively. Also conversely, if the third mode of operation is selected in operation 502, the respective filters in filter set 358 are selected by circuitry 60 for comparison to the subnet identification value supplied via lines 714 and 718, and the respective filters in filter set 360 are selected by circuitry 60 for comparison to the subnet identification value supplied via lines 720 and 722. Each respective comparator circuit 730 may generate, as part of operation 506, one or more respective values that may indicate the respective results of its respective determination (i.e., whether its respective first input matches its respective second input). Based, at least in part upon these values generated by circuits 730, comparator circuitry 724 may generate, as output, one or more data words propagated via one or more signal lines 726. These one or more data words may comprise one or more values that may indicate each of these respective results.

As part of operation 506, mask circuitry 732 may receive, as input, these one or more data words propagated via one or more signal lines 726. Also as part of operation 506, mask circuitry 732 also may receive, as input, the one or more control signals that may be propagated via one or more signal lines 710. Based at least in part upon these one or more data words and the one or more control signals, mask circuitry 732 may generate, output, one or more respective output words that may be propagated via signal lines 734 to the operative ports in one or more ports 85. For example, mask circuitry 732 may determine based at least in part upon the one or more control signals the operating mode of circuitry 80 selected in operation 502, and based at least in part upon this determination, mask circuitry 732 also may determine which of the ports in one or more ports 85 may be operative. These one or more output words may indicate, for each respective packet 91 whose respective subnet identification value 93 was compared by circuitry 724 to generate the one or more data words propagated via one or more signal lines 726, whether the respective packet 91 should be dropped by the respective port in one or more ports 85 that received the respective packet 91. For example, if the one or more data words propagated via one or more lines 726 indicate that one of the comparator circuits 730 determined that this respective identification value 93 matches one of the filters in filter set 75, these one or more output words may indicate that the port in one or more ports 85 that received respective packet 91 comprising this respective subnet identification value 93 should not drop this respective packet 91. Conversely, if the one or more data words propagated via one or more lines 726 indicate that none of the comparator circuits 730 determined that this respective identification value 93 matches any the filters in filter set 75, these one or more output words may indicate that the port in one or more ports 85 that received respective packet 91 comprising this respective subnet identification value 93 should drop this respective packet 91.

Thus, circuitry 700 is capable of mapping packet subnet identification values to subsets of comparator circuits 730. This permits circuitry 700 to utilize a reduced number of comparator circuits to perform comparisons between packet subnet identification values and filters, compared to the prior art. Advantageously, this permits the circuitry 80 to be reduced in size, to utilize less power, and to exhibit improved design flexibility compared to the prior art Although not shown in the Figures, in addition to comprising circuitry 700, if, for example, port circuitry 80 is comprised in, for example, an intermediate station node in one or more intermediate station nodes 110, port circuitry 80 also may comprise additional circuitry that may be utilized by circuitry 80 as part of operation 506 in determining whether to drop one or more packets 97 that are intended to be transmitted from one or more ports 85. That is, as a result of control circuitry 60 signaling port circuitry 80, port circuitry 80 may utilize this additional circuitry and/or circuitry 700 in determining whether to drop one or more received packets 91 and/or one or more outbound packets 97, respectively. Subject to the following exceptions, this additional circuitry may have a respective construction and operation that may be substantially identical to the respective construction and operation of circuitry 700. For example, one such exception may be that the algorithms that may be executed by the comparator circuitry in the additional circuitry may differ from those executed by comparator circuitry 724 and may determine whether the one or more subnet identification values in outgoing packets 97 match these one or more filters in accordance with, e.g., one or more algorithms described in the IBA Specification for outbound p_key enforcement implemented by switches and/or routers for purposes of, e.g., enforcing subnet partitions. Control circuitry 60 may be capable of commanding port circuitry 80 to utilize in operation 506 circuitry 700 and/or this additional circuitry in determining, based at least in part upon the one or more sets of filters selected by circuitry 504 as a result of operation 504, whether to drop one or more received packets 91 and/or one or more outgoing packets 97, respectively. For example, circuitry 60 may receive one or more commands from host processor 12 and/or the network management agent that may request that port circuitry 80 utilize in operation 506 circuitry 700 and/or this additional circuitry in determining, based at least in part upon the one or more sets of filters selected by circuitry 504 as a result of operation 504, whether to drop one or more received packets 91 and/or one or more outgoing packets 97, respectively. In response, at least in part, to receiving these one or more commands, circuitry 60 may provide one or more signals to port circuitry 80 that may command port circuitry 80 to utilize in operation 506 circuitry 700 and/or this additional circuitry in the manner requested in the one or more commands from host processor 12 and/or the network management agent.

Additionally or alternatively, although not shown in the Figures, if subnet identification values 93 comprise p_keys, circuitry 700 may include circuitry to determine, in accordance with techniques and/or algorithms disclosed in the IBA Specification, whether a p_key mismatch violation exists for such p_keys. If circuitry 700 determines that such a mismatch violation exists, circuitry 700 may indicate same to circuitry 60, 80, and/or 85 which may take appropriate action based thereon.

Thus, in summary, one system embodiment may include a circuit board including a bus slot, and a circuit card capable of being coupled to the slot. The circuit card may comprise control circuitry and port circuitry. When the circuit card is coupled to the slot, the control circuitry may be capable of selecting, from a plurality of operating modes of the port circuitry, one operating mode of the port circuitry. The plurality of operating modes may correspond to respective sets of one or more communication links via which the port circuitry may be capable of communicating when the port circuitry is operating in the respective operating modes. Each of the respective sets of one or more communication links may be different from each other. When the circuit card is coupled to the slot, the control circuitry also may be capable of selecting, based at least in part upon the one operating mode of the port circuitry selected from the plurality of operating modes, a set of filters. The port circuitry may be capable of determining, based at least in part upon the set of filters, whether to drop a packet that is one of received and to be transmitted by the port circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
   selecting, from a plurality of operating modes of port circuitry, one operating mode of the port circuitry based upon communication capabilities at a remote node, the plurality of operating modes corresponding to respective sets of one or more communication links via which the port circuitry is capable of communicating when the port circuitry is operating in the respective operating modes, each of the respective sets of one or more communication links being different from each other; and
   selecting, based upon the one operating mode of the port circuitry selected from the plurality of operating modes, a set of filters associated with the one operating mode, the port circuitry being capable of determining, based upon the set of filters, whether to drop a packet that is one of received and to be transmitted by the port circuitry.

2. The method of claim 1, wherein: the set of filters comprises a subset of available filters; and each of the plurality of operating modes is associated with one or more respective subsets of available filters.

3. The method of claim 1, wherein: the set of filters comprises one or more filters; and the one or more filters indicate membership in one or more groups associated with the one or more filters.

4. The method of claim 1, wherein: the plurality of operating modes comprises a first operating mode and a second operating mode; in the first operating mode, the port circuitry is capable of communicating via one communication link at a first communication rate; in the second operating mode, the port circuitry is capable of communicating via a plurality of communication links at a second communication rate, the first rate and the second rate being different from each other.

5. The method of claim 1, wherein: the plurality of operating modes comprises a first operating mode, a second operating mode, and a third operating mode; in the first operating mode, the set of filters comprises four subsets of a predetermined maximum number of filters; in the second operating mode, the set of filters comprises two subsets of the predetermined maximum number of filters; and in the third operating mode, the set of filters comprises the predetermined maximum number of filters.

6. The method of claim 1, wherein: the port circuitry determines, based at least in part upon the set of filters, whether to drop a first packet received by the port circuitry; and the port circuitry also determines, based at least in part upon the set of filters, whether to drop a second packet designated to be transmitted from the port circuitry.

7. The method of claim 1, wherein: the set of filters comprises one or more partition keys.

8. An apparatus comprising: control circuitry to select, from a plurality of operating modes of port circuitry, one operating mode of the port circuitry based upon communication capabilities at a remote node, the plurality of operating modes corresponding to respective sets of one or more communication links via which the port circuitry is capable of communicating when the port circuitry is operating in the respective operating modes, each of the respective sets of one or more communication links being different from each other, the control circuitry also being capable of selecting, based upon the one operating mode of the port circuitry selected from the plurality of operating modes, a set of filters associated with the one operating mode, the port circuitry being capable of determining, based upon the set of filters, whether to drop a packet that is one of received and to be transmitted by the port circuitry.

9. The apparatus of claim 8, wherein: the set of filters comprises a subset of available filters; and each of the plurality of operating modes is associated with one or more respective subsets of available filters.

10. The apparatus of claim 8, wherein: the set of filters comprises one or more filters; and the one or more filters indicate membership in one or more groups associated with the one or more filters.

11. The apparatus of claim 8, wherein: the plurality of operating modes comprises a first operating mode and a second operating mode; in the first operating mode, the port circuitry is capable of communication via one communication link at a first communication rate; in the second operating mode, the port circuitry is capable of communicating via a plurality of communication links at a second communication rate, the first rate and the second rate being different from each other.

12. The apparatus of claim 8, wherein: the plurality of operating modes comprises a first operating mode, a second operating mode, and a third operating mode; in the first operating mode, the set of filters comprises four subsets of a predetermined maximum number of filters; in the second operating mode, the set of filters comprises two subsets of the predetermined maximum number of filters; and in the third operating mode, the set of filters comprises the predetermined maximum number of filters.

13. The apparatus of claim 8, wherein: the port circuitry is capable of determining, based at least in part upon the set of filters, whether to drop a first packet received by the port circuitry; and the port circuitry also is capable of determining, based at least in part upon the set of filters, whether to drop a second packet designated to be transmitted from the port circuitry.

14. The apparatus of claim 8, wherein: the set of filters comprises one or more partition keys.

15. An article comprising: a storage medium having stored thereon instructions that when executed by a machine result in the following:
selecting, from a plurality of operating modes of port circuitry, one operating mode of the port circuitry based upon communication capabilities at a remote node, the plurality of operating modes corresponding to respective sets of one or more communication links via which the port circuitry is capable of communicating when the port circuitry is operating in the respective operating modes, each of the respective sets of one or more communication links being different from each other; and
selecting, based upon the one operating mode of the port circuitry selected from the plurality of operating modes, a set of filters associated with the one operating mode, the port circuitry being capable of determining, based upon the set of filters, whether to drop a packet that is one of received and to be transmitted by the port circuitry.

16. The article of claim 15, wherein: the set of filters comprises a subset of available filters; and each of the plurality of operating modes is associated with one or more respective subsets of available filters.

17. The article of claim 15, wherein: the set of filters comprises one or more filters; and the one or more filters indicate membership in one or more groups associated with the one or more filters.

18. The article of claim 15, wherein: the plurality of operating modes comprises a first operating mode and a second operating mode; in the first operating mode, the port circuitry is capable of communicating via one communication link at a first communication rate; in the second operating mode, the port circuitry is capable of communicating via a plurality of communication links at a second communication rate, the first rate and the second rate being different from each other.

19. The article of claim 15, wherein: the plurality of operating modes comprises a first operating mode, a second operating mode, and a third operating mode; in the first operating mode, the set of filters comprises four subsets of a predetermined maximum number of filters; in the second operating mode, the set of filters comprises two subsets of the predetermined maximum number of filters; and in the third operating mode, the set of filters comprises the predetermined maximum number of filters.

20. The article of claim 15, wherein: the port circuitry is capable of determining, based at least in part upon the set of filters, whether to drop a first packet received by the port circuitry; and the port circuitry also is capable of determining, based at least in part upon the set of filters, whether to drop a second packet designated to be transmitted from the port circuitry.

21. The article of claim 15, wherein: the set of filters comprises one or more partition keys.

22. A system comprising:
a circuit board comprising a circuit card slot; and
a circuit card capable of being coupled to the slot, the circuit card comprising control circuitry and port circuitry, when the circuit card is coupled to the slot, the control circuitry being capable of selecting, from a plurality of operating modes of the port circuitry, one operating mode of the port circuitry based upon communication capabilities at a remote node, the plurality of operating modes corresponding to respective sets of one or more communication links via which the port circuitry is capable of communicating when the port circuitry is operating in the respective operating modes, each of the respective sets of one or more communication links being different from each other, when the circuit card is coupled to the slot, the control circuitry also being capable of selecting, based upon the one operating mode of the port circuitry selected from the plurality of operating modes, a set of filters associated with the one operating mode, the port circuitry being capable of determining, based upon the set of filters, whether to drop a packet that is one of received and to be transmitted by the port circuitry.

23. The system of claim 22, wherein: the circuit card comprises a channel adapter.

24. The system of claim 22, further comprising: one or more network communication media via which the port circuitry is capable of communicating with an external device.

25. The system of claim 22, wherein: an intermediate station comprises the circuit board and the circuit card.

26. The system of claim 25, wherein: the intermediate station comprises one of a switch node and a router node.

27. The system of claim 22, wherein: the packet comprises information; and the port circuitry is capable of determining, based at least in part upon a comparison of the information to the set of filters, whether to drop the packet.

28. The system of claim 27, wherein: the information comprises a partition key.

* * * * *

UNITED STATES PATENT AND TRADEMARK OFFICE
CERTIFICATE OF CORRECTION

PATENT NO. : 7,233,996 B2
APPLICATION NO. : 10/293170
DATED : June 19, 2007
INVENTOR(S) : Kaniyur et al.

It is certified that error appears in the above-identified patent and that said Letters Patent is hereby corrected as shown below:

In column 14, at line 49, delete "communication" and insert
--communicating--.

Signed and Sealed this

Eighth Day of April, 2008

JON W. DUDAS
*Director of the United States Patent and Trademark Office*